L. ARKIN.
FASTENER.
APPLICATION FILED DEC. 6, 1917.
1,271,650.
Patented July 9, 1918.
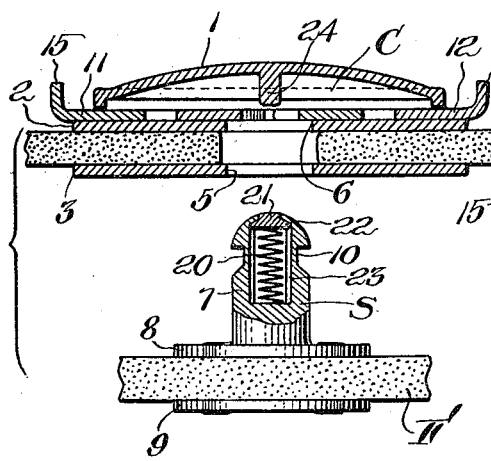
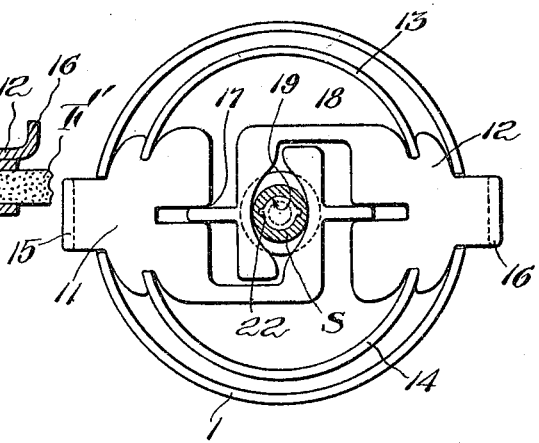
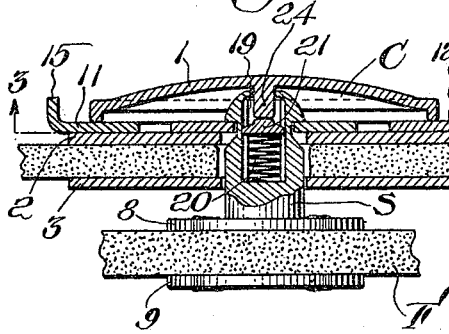
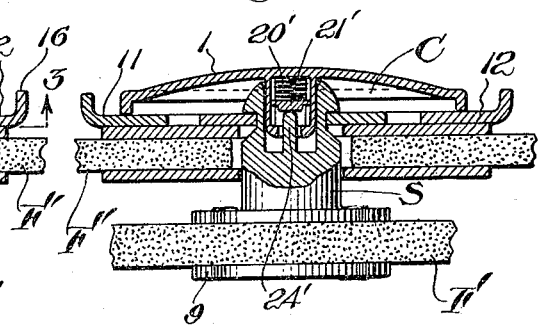
Inventor:
Louis Arkin,
by Roberts, Roberts & Cushman
his Attorneys.

UNITED STATES PATENT OFFICE.

LOUIS ARKIN, OF BOSTON, MASSACHUSETTS.

FASTENER.

1,271,650.

Specification of Letters Patent.

Patented July 9, 1918.

Application filed December 6, 1917. Serial No. 205,735.

*To all whom it may concern:*

Be it known that I, LOUIS ARKIN, a citizen of the United States, and resident of Boston, in the county of Suffolk and State of Massachusetts, have invented new and useful Improvements in Fasteners, of which the following is a specification.

This invention relates to fasteners and more particularly to fasteners for dresses, gloves, automobile curtains and the like.

The fasteners of the ordinary types heretofore provided, in which the stud must be forced into and out of the socket, often give rise to much trouble for the reason that the members fit either too loosely or too tightly. Moreover, even when the parts are properly adjusted to each other they must fit fairly tightly in order to hold together and for many uses, such as for thin and delicate dresses, the fabric to which the parts of the fastener are applied is not sufficiently strong to withstand the pull required to separate the parts when fitted tightly enough together to hold under normal conditions of usage. In some cases, as with automobile curtains, it is highly inconvenient if not indeed impossible, to press the two parts of a fastener together with sufficient force to lock them together where they are fitted sufficiently tightly to hold in stiff winds or other more or less severe operating conditions.

Moreover, for certain classes of use these fasteners must be compact and unobtrusive so as not to project out from the article to which they are applied to such extent as to be unsightly or as to catch upon garments or other articles coming in contact therewith. It is particularly desirable that small fasteners for thin dresses and the like lie flat against the fabric so as not to catch in lace or other light material of the garment. Likewise it is greatly to be desired that larger fasteners for automobile curtains and the like should not project outwardly so as to catch in the garments of passengers passing into or out of the vehicle.

It is the object of the present invention to overcome the above mentioned difficulties by providing locking means which may be moved into and out of locking position to permit the stud to be readily passed into or out of the socket, and to hold the parts securely together when in locking position, by providing yielding means for separating the parts when unlocked, and by associating the parts together in a novel manner such that the fasteners are compact and unobtrusive.

Other objects of the invention will be apparent from the following description and the accompanying drawings, in which—

Figure 1 is a central longitudinal section through one embodiment of the invention showing the parts in detached relationship;

Fig. 2 is a similar view showing the parts attached together;

Fig. 3 is a transverse section taken on the line 3—3 of Fig. 2; and

Fig. 4 is a central longitudinal section through a second embodiment of the invention.

Each of the embodiments of the invention chosen for the purpose of illustration comprises a stud S secured to a piece of fabric F and a socket or casing C secured to a similar piece of fabric F', although it is to be understood that the two parts of the fastener may be applied to any two articles in any desired manner. The socket member C comprises a convex top portion 1 and two base plates 2 and 3 secured together through the fabric F', the base plates being provided with axial apertures 5 and 6 to receive the stud S. The stud S comprises a post 7 and two base plates 8 and 9 secured together through the fabric F, the post 7 being provided with an annular recess 10 near its outer end for the purpose of locking it in the socket.

The means for locking the stud in the socket preferably, though not essentially, comprises a pair of hook members 11 and 12 sliding transversely of the axis of the socket on the base plate 2. The inner hook-like ends of the members 11 and 12 interfit with each other and are provided with opposing concavities to receive the stud S. Springs 13 and 14 fitting into recesses in the sides of the members 11 and 12 urge the locking members outwardly so as to hold the hook ends together against the stud S. The members 11 and 12 are provided with upturned extensions 15 and 16 projecting outwardly through openings in the cap 1 with which to press the members inwardly against the action of the springs to release the stud. Lugs 17 and 18 project outwardly from the hook ends into recesses in the locking members to guide the members in their radial movement.

The means for separating the stud and socket members illustrated in Figs. 1 to 3 is comprised as follows: In the upper end of the stud post 7 is a cylindrical axial recess 19 containing a coiled compression spring 20 which bears against the bottom of the recess at one end and against a cap 21 at the other end. The cap is provided with an end portion of relatively small diameter fitting into the restricted end of the recess so that the stud presents a smooth rounding end when the cap is in normal position. The inner end of the cap is of large diameter, thereby affording a flange to prevent the cap from passing out of the recess. Projecting from opposite sides of the flange of the cap 21 are lugs 22 adapted to slide in grooves 23 in the recess, thereby to guide the cap in its longitudinal movement in the recess. A pin 24 projects inwardly from the casing 1 along the axis of the socket, the pin being of such diameter as to pass into the recess in the end of the stud when the stud is inserted into the socket. The pin preferably fits snugly into the recess as shown, so as to prevent rocking or other lateral movement of the parts relatively to each other.

The means for separating the stud and socket in Fig. 4 is the same as in Figs. 1 to 3 except that the parts are reversed, the spring 20' and cap 21' being disposed in a cylindrical recess in the socket and the pin 24' being located on the stud.

The operation of the two illustrative embodiments is substantially the same. When the stud is inserted into the socket the locking members are forced apart by the rounded end of the stud until the head of the stud passes the locking members whereupon the locking members snap into the annular recess 10 and lock the stud in position. As the stud passes into the socket the pin 24 engages the cap 21 and compresses spring 20. When the locking members are pressed inwardly to release the stud the spring 20 is permitted to expand and thereby separate the complemental parts of the fastener without any rotation of the stud or socket or any other manipulation of the stud or socket.

Obviously the structural embodiment of the present invention may be variously modified within the scope of the appended claims and I do not desire to be limited to the illustrated embodiments of the invention.

I claim:—

1. A fastener comprising complemental stud and socket members, the stud having a recess in the forward end thereof, and coacting means on the socket member and in said recess respectively for separating said members, the coacting means including elastic means arranged to be compressed when the stud is inserted into the socket.

2. A fastener comprising complemental stud and socket members, the stud having a recess therein, means for locking the stud in the socket, and coacting means arranged in the socket and recess respectively so as automatically to separate the stud and socket members when released by said locking means.

3. A fastener comprising complemental stud and socket members, the stud having a recess therein, elastic means in said recess, and means on the socket arranged to distort the elastic means when the stud is inserted into the socket so as to tend to separate the said members.

4. A fastener comprising complemental stud and socket members, the stud having a recess therein, means for locking the stud in the socket, a compression spring in the recess, and a member projecting from the socket so as to pass into said recess and compress the spring when the stud is inserted into the socket, whereby the stud and socket members are automatically separated when unlocked.

5. A fastener comprising complemental stud and socket members, the stud having a a recess therein, means for locking the stud in the socket, a compression spring in the recess, a cap arranged over the spring so as to close the end of the recess and so that the forward end of the stud presents a smooth surface, and a member projecting from the socket so as to engage said cap and compress the spring when the stud is inserted into the socket, whereby the stud and socket members are automatically separated when unlocked.

Signed by me at Boston, Massachusetts, this 1st day of December, 1917.

LOUIS ARKIN.

Copies of this patent may be obtained for five cents each, by addressing the "Commissioner of Patents, Washington, D. C."